United States Patent [19]

Mikiya

[11] Patent Number: 4,563,603
[45] Date of Patent: Jan. 7, 1986

[54] HOLDER ARRANGEMENT FOR THE RECIPROCATING ROD OF ELECTROMAGNETIC RECIPROCATOR DEVICE

[76] Inventor: Toshio Mikiya, 9-17, Todoroki 1-chome, Setagaya-ku, Tokyo, Japan

[21] Appl. No.: 609,342

[22] Filed: May 11, 1984

[30] Foreign Application Priority Data

May 12, 1983 [JP] Japan ............................. 58-69831[U]

[51] Int. Cl.$^4$ ............................................. H02K 33/00
[52] U.S. Cl. .......................................... 310/30; 310/15
[58] Field of Search ..................... 310/27, 30, 34, 35, 310/15

[56] References Cited

U.S. PATENT DOCUMENTS 1,493,259 5/1929 Green ..................................... 310/30
2,632,791 3/1953 Side ..................................... 310/30 X Primary Examiner—Donovan F. Duggan
Attorney, Agent, or Firm—Birch, Stewart, Kolasch & Birch

[57] ABSTRACT

A holder arrangement for the reciprocating rod of an electromagnetic reciprocator includes a reciprocating rod capable of reciprocating axially by magnetic action or the alternate combination of magnetic and spring actions, thereby effecting movement of a working member or members mounted at one end or both ends of said rod over a given stroke. In this arrangement, a flexible rod holder is disposed at a suitable position of a base to which an electromagnet is attached, said holder being provided with a flexible tongue piece for holding said reciprocating rod.

2 Claims, 6 Drawing Figures

HOLDER ARRANGEMENT FOR THE RECIPROCATING ROD OF ELECTROMAGNETIC RECIPROCATOR DEVICE

BACKGROUND OF THE INVENTION

The present invention relates to a holder arrangement for the recipocating rod of an electromagnetic reciprocator device.

Electromagnetic reciprocator devices including a reciprocating rod capable of reciprocating axially by magnetic action or the alternate combination of magnetic and spring actions, thereby effecting the movement of a working diaphragm or piston or diaphragms or pistons mounted at one end or both ends of the reciprocating rod over a given stroke are known from Japanese Utility Model publication No. 56-42448 and Japanese Laid-Open Patent Publications Nos. 56-77582 and 57-135282.

With this type of electromagnetic reciprocators, however, since a side force serving to attract the reciprocating rod toward the poles of an electromagnet is exerted, the axes of the reciprocating rod and the associated cylinder are misaligned during reciprocation. For that reason, when a piston is used as the working member, local wearing of the piston takes place, or when a diaphragm is used as the working member, an uneven force (a local load) acts radially on the diaphragm, and hampers smooth operation thereof.

SUMMARY OF THE INVENTION

A main object of the present invention is therefore to avoid biasing movement of the reciprocating rod and prevent local wearing and break-down of the working member.

According to the present invention, this object is achieved by the provision of a holder arrangement for the reciprocating rod of an electromagnetic reciprocator device including a reciprocating rod capable of reciprocating axially by magnetic action or the alternate combination of magnetic and spring actions, thereby effecting movement of a working member or members mounted at one end or both ends of said rod over a given stroke, wherein:

a flexible rod holder is disposed at a suitable position on a base to which an electromagnet is attached and perpendicularly with respect to said reciprocating rod, said holder being provided with a flexible tongue piece for holding said reciprocating rod.

BRIEF DESCRIPTION OF THE DRAWINGS

The aforesaid and other objects and features of the present invention will become apparent from a reading of the following detailed description with reference to the drawings, which are given for the purpose of illustration alone, and in which.

DETAILED DESCRIPTION OF THE INVENTION

Figure 1:
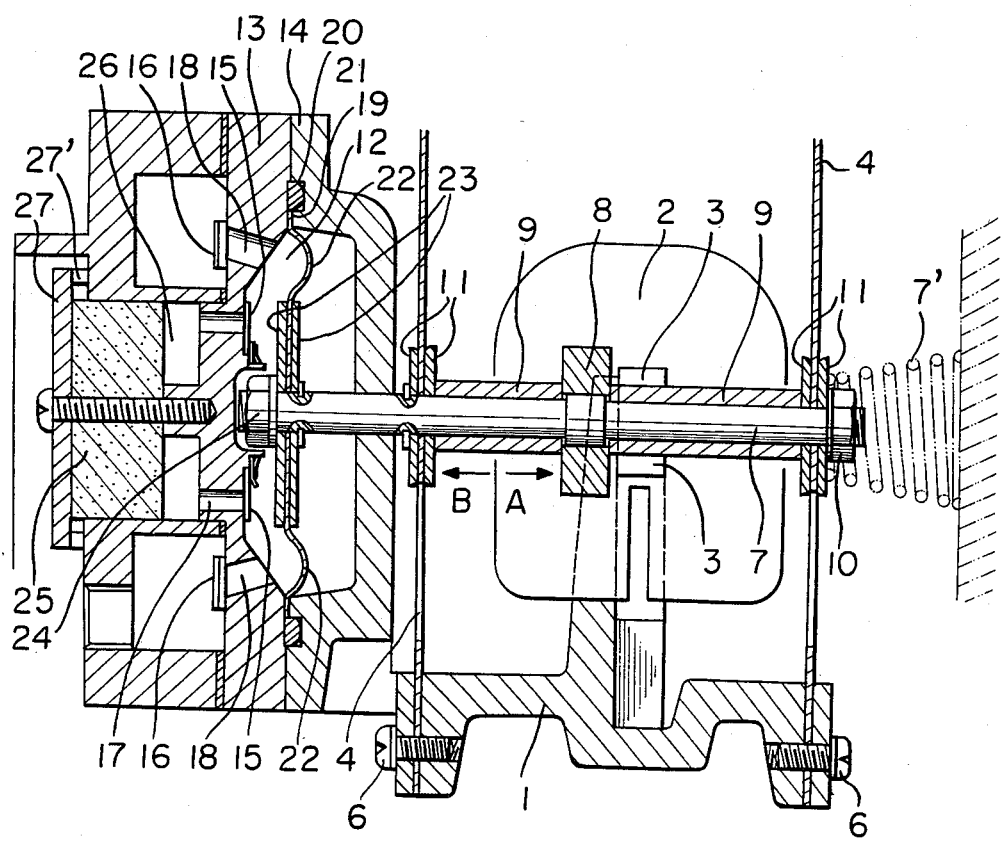
FIG. 1 is a longitudinally sectioned front view showing one embodiment of the electromagnetic reciprocator device according to the present invention.
Figure 2:
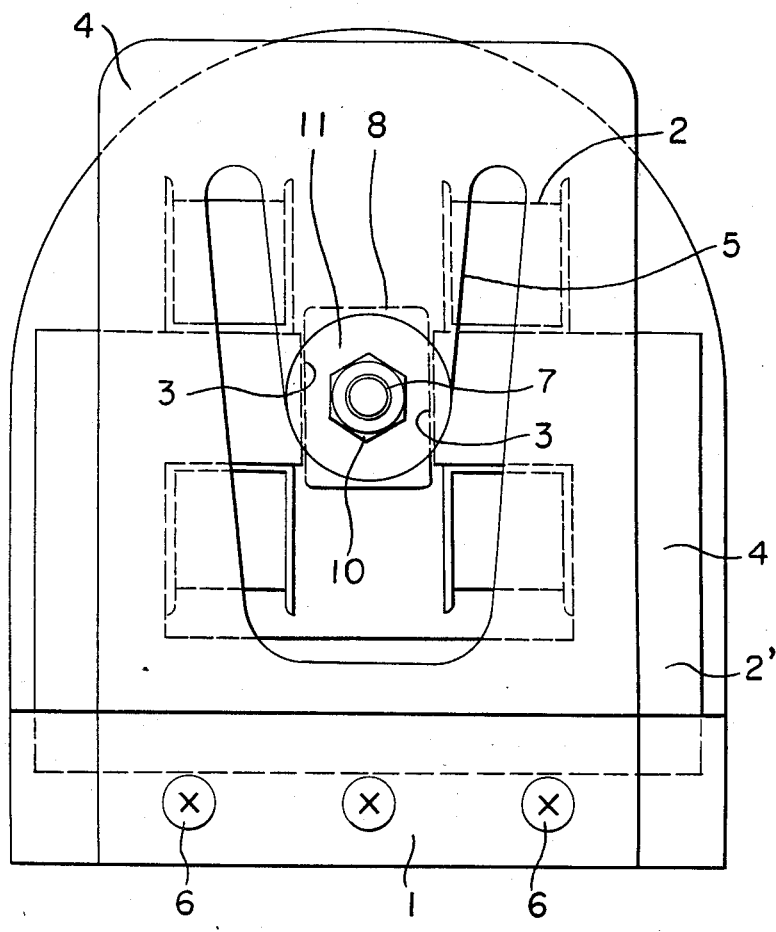
FIG. 2 is a right side view of that embodiment.
Figure 3:
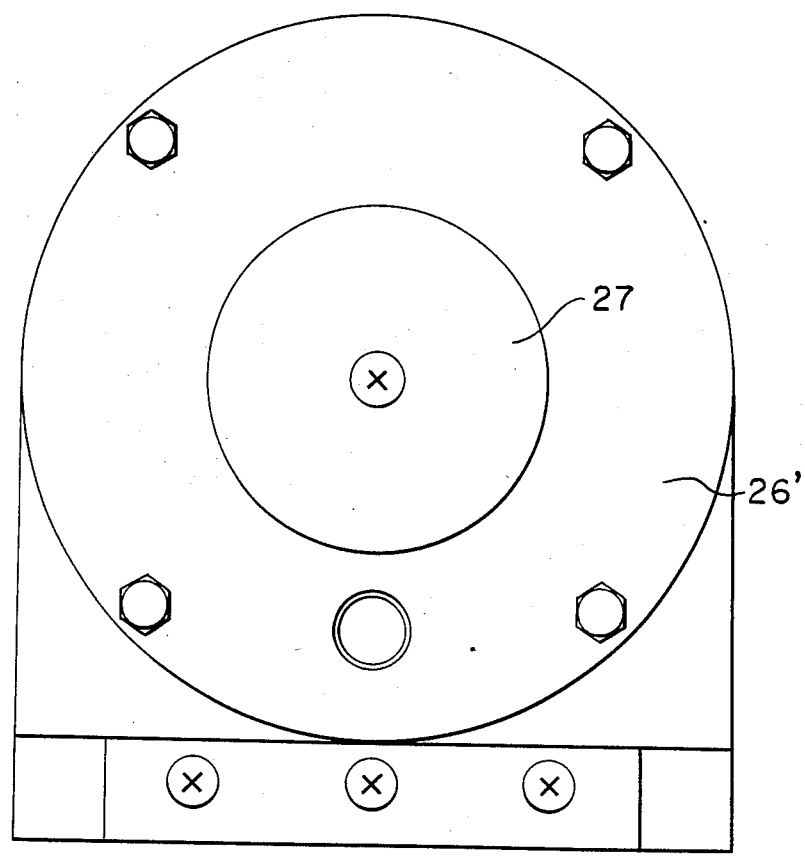
FIG. 3 is a left side view of that embodiment.

Referring to FIG. 1, a base 1 for an electromagnetic reciprocator is vertically provided at its center with an electromagnet 2 including a pair of opposite poles 3 and 3 located at the required interval.

A rod holder 4 is vertically fixed to the base 1 with the electromagnet 2 being disposed at the center thereof. In this embodiment, a thin steel plate or a thin metal plate such as, for instance, a phosphor bronze plate, is formed into a generally rectangular frame by press forming, which includes in the middle portion a depending tongue-like portion for holding a reciprocating rod (hereinafter referred to as the holder tongue 5).

The height of the holder 4 is determined by taking the height of a pneumatic chamber 12 (to be described hereafter into consideration. Likewise, the length of the holder tongue 5 is determined taking the attitude at which the poles 3 and 3 are positioned into account. The main part of the rod holder 4 is relatively larger in size but smaller in flexibility than the holder tongue 5. When the holder 4 bends in the right and left direction in FIG. 1, the holder tongue 5 bends in the direction opposite to the main part of the holder 4 to maintain a horizontally reciprocating rod 7 (to be described below) held by the holder tongue 5 in a horizontally state. It is to be noted that reference numeral 6 stands for a clamping bolt for the rod holder 4.

An armature 8 moves transversely with respect to the magnetic line of force generated between the opposite poles 3 and 3 of the electromagnet 2, and is fixed to the central portion of the reciprocating rod 7 which is horizontally secured at suitable positions to the flexible free ends of the holder tongues 5. The reciprocating rod 7 is urged in the left direction by a compression spring 7' indicated by a phantom line, so that it is maintained at the position as shown in FIG. 1 along with the armature 8, when no current passes through the magnet 2.

A collar 9 is provided to fix the armature 8 on the horizontally reciprocating rod 7, and a clamping nut 10 is mounted to clamp the holder 7 onto the free ends of the holder tongue 5. Reference numeral 11 denotes reinforcing spring washers for clamping the holder tongue 5 therebetween.

A pneumatic chamber 12 has its center located on the axis of the horizontally reciprocating rod 7, and compresses inner and outer casings 14 and 13 which are detachably fixed to the base 1. The outer casing 13 is provided therein with a suction inlet 17 and a discharge outlet 18 through the associated valves 15 and 16.

The outer and inner casings 14 and 13 are provided in their opposite faces with a round, shallow groove 19 which is open toward the pneumatic chamber 12 and a round, shallow groove 20 which does not reach that chamber. A diaphragm 22 includes a thickened peripheral edge portion 21, and is clamped between the opposite faces of the outer and inner casings 14 and 13 by fitting its portion 21 into the groove 20.

The diaphragm 22 is fixed at the central portion to the end of the rod 7 by means of a clamping nut 24, and clamped between washers 23 and 23. An amount of air sucked into the pneumatic chamber 12 is compressed and discharged by the reciprocation of the rod 7.

A filter 25 for filtering the air admitted into the chamber 12 is detachably in an air suction chamber 26 confronting the suction inlet 17. The filter 25 is protected by a covering 27 through a spacer 27'.

The foregoing embodiment operates as follows.

When an alternate current is half-wave rectified and applied to the electromagnet 2, the magnet 2 is excited by the positive half-wave. At this time, the armature 8 is attracted in between the poles 3 and 3, while compressing the compression spring 7' indicated by a phantom line. Thus, the horizontally reciprocating rod 7 supporting the armature 8 moves in the direction indicated by an arrow A in FIG. 1, and the diaphragm 22 fixed at the central portion to the rod 7 works, so that a negative pressure is generated within the pneumatic chamber 12 to open the valve 15. The air then passes through the filter 25, and is introduced into the chamber 12 through the suction inlet 17.

Subsequently, the electromagnet 2 is demagnetized by the negative half-wave, and the rod 7 moves back in the direction indicated by an arrow B in FIG. 1 under the action of the spring 7', so that the diaphragm 22 returns to the position shown in FIG. 1. Thus, the air introduced into the chamber 12 is gradually compressed in the course of retraction of the rod 7. When the air pressure reaches a given value, the valve 16 is opened to discharge the air.

When the excitation and deexcitation of the electromagnet 2 are repeated every single cycle of the alternate current, the rod 7 is repeatedly reciprocated to continuously compress the air. In the meantime, since the fixed portion of that rod 7 moves therewith, the holder tongue 5 supporting the rod 7 moves simultaneously with repeated bending of the holder 4 in the direction opposite thereto. Thus, the holder 4 and the holder tongue 5 rocks in the direction of the movement of the rod 7 and in a well-balanced state, whereby a wind is generated to cool the magnet 2.

The rocking movement of the holder 4 takes place around the fixed point of the upper face of the base 1 to which the holder 4 is fixed, and the rocking movement of the holder tongue 5 depending from the holder 4 takes place around the fixed point of the upper face of the holder 4. Thus, the horizontally reciprocating rod 7 and the associated armature 8 are not affected by the side force of a magnetic field generated between the poles 3 and 3 of the electromagnet 2. Therefore, the rod 7 is horizontally reciprocated without departing from the axis the line passing through the center of the poles 3 and 3 and the center of the diaphragm 22, so that a load biased in the radial direction is not possibly applied to the diaphragm 22 fixed at the central portion to the rod 7.

In the embodiment as illustrated in the drawings, the horizontally reciprocating rod 7 for actuating the diaphragm 22 is held on both sides of the armature 8 by the holder tongues 5 and 5. However, it is to be understood that the rod 7 may not be necessarily supported on both sides of the armature 8. In other words, the influence of the aforesaid side force is markedly reduced by supporting the holder 7 with the holder tongue 5 remote from the armature 8 or located on the right side in FIG. 1.

The horizontally reciprocating rod 7 may be in the plate, rod or shaft form, but should not possess flexibility.

Figure 4:
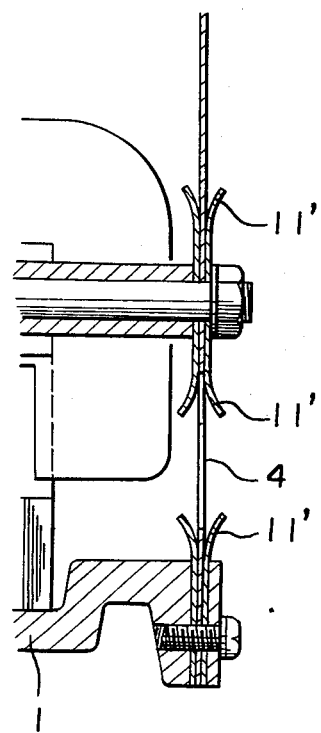
FIG. 4 is a front view, partially longitudinally sectioned, showing another embodiment of the present invention.
Figure 5:
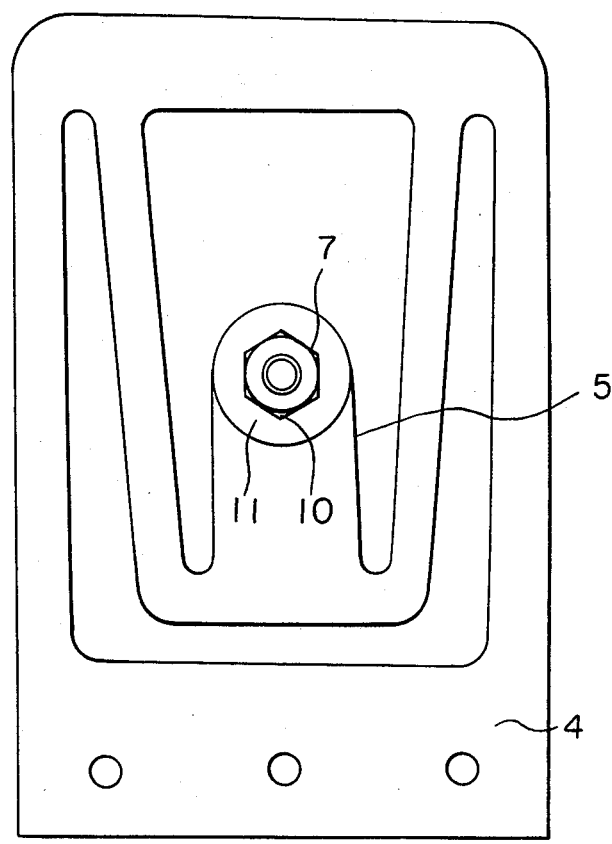
FIGS. 5 and 6 are front views showing other forms of the rod holder according to the present invention.
Figure 6:
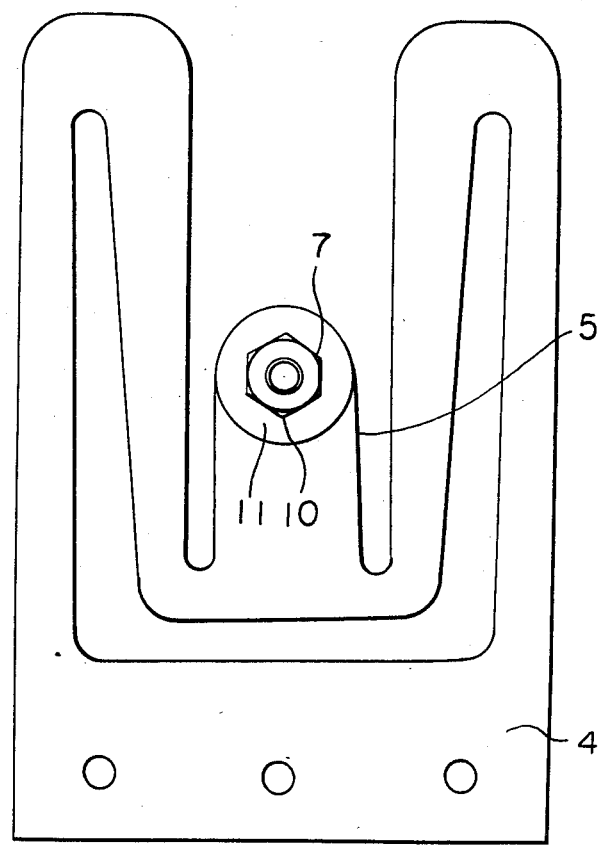

In the foregoing embodiment, the rod holder 4 is formed of the same material as that forming the holder tongues 5. However, it is also possible to form the rod holder 4 of a plastic material and the holder tongues of a thin steel plate, provided that they are connected with each other in such a manner that they bend easily. Alternatively, curved reinforcing plates 11' may be mounted in place of the reinforcing washers 11, as illustrated in FIG. 4. The plates 11' may be disposed onto the base 1. Furthermore, the holder tongue 5 may be substantially be increased in length as illustrated in FIG. 5. Alternatively, the holder tongue 5 may be erected from below, as shown in FIG. 6.

As illustrated, the field core 2' of the electromagnet 2 may be of a C-shape, but an E-type field core may be used. Furthermore, a permanent magnet or electromagnet may be used in lieu of the armature 8. However, when an electromagnet is used for the armature, it is required that a permanent magnet be used for the aforesaid electromagnet 2.

According to the present invention, the reciprocating rod is invariably in alignment with the axis thereof during reciprocation, so that, even when the rod receives magnetic force defining a driving force therefor and a side force of magnetism, the reciprocating movement thereof is not affected at all. Thus, it is unlikely that the armature may collide with the poles. When a permanent magnet is used in place of the armature, it is unlikely that it may collide with the field core of the electromagnet. Furthermore, when an electromagnet is used in lieu of the armature, it does not collide with the permanent magnet surrounding a space for movement. By stabilizing the movement of the reciprocating rod in this manner, it is possible to, on the one hand, prevent damage of the working diaphragm or local wearing of the working piston and, on the other hand, prevent burning-out of a coil defining the electromagnet.

According to the present invention, it is possible to reduce the space between the poles of the electromagnet and the armature to a minimum by stabilizing the movement of the reciprocating rod. This results in an increase in the magnetic force acting upon the armature and thus sharp movement of the reciprocating rod.

The present invention is especially useful in embodiments wherein a diaphragm is used as the working member. In the conventional electromagnet reciprocators, the reciprocating rod itself is biased by deformation of the diaphragm and a local load applied thereon. For that reason, certain limitations have been imposed upon a reduction in the space between the poles and the armature or the permanent magnet. According to the present invention described above, since the reciprocating rod is not affected by deformation of the diaphragm and a local load applied thereon, it is possible to considerably extend the service life of the diaphragm.

While the present invention has been described with reference to the preferred embodiments thereof, it is understood that many changes or modifications may be made without departing from the scope as defined in the appended claim.

What is claimed is:

1. An electromagnetic reciprocator device comprising:
    an electromagnet;
    a rod holder operatively positioned relative to said electromagnet and spaced a prescribed distance apart from the same for swingably mounting said rod holder to move toward and away from said electromagnet;
    a reciprocating rod having a first end and a second end, said first end being fixed to said rod holder and extending to pass through the vicinity of said electromagnet and said second end of said rod being fixed to a diaphragm member which is movable in a reciprocating manner; and an armature fixed to said reciprocating rod in the vicinity of said electromagnet so as to be moved toward and away from said electromagnet;

said electromagnet comprises a C-shaped field core provided with a pair of magnetic poles opposite to and spaced a prescribed distance apart from each other;

said rod holder being supported in a cantilever-like manner and constructed of a thin plate including a rectangular frame shape having a large width where said rod holder acts as an effective cooling fan during its swinging movement and further includes a cantilever type tongue portion extending into an aperture provided in a middle portion inside said rod holder;

said reciprocating rod has a sufficient rigidity and one end thereof is perpendicularly fixed to said tongue portion of said rod holder;

said armature being disposed outside a magnetic circuit formed of said field core of said electromagnet, a width of said armature being narrower than said prescribed distance between said pair of magnetic poles of said electromagnet to enable said armature to enter a space between said pair of magnetic poles of said electromagnet; and a compression spring being mounted on said first end of said reciprocating rod which is fixed to said rod holder wherein said compression spring imparts a resilient biasing force to said reciprocating rod.

2. An electromagnetic reciprocator device according to claim 1, and further including a pair of rod holders displaced relative to each other for supporting said reciprocating rod and for acting as effective cooling fans during movement.

* * * * *